(12) United States Patent
Kuriyama et al.

(10) Patent No.: US 9,700,916 B2
(45) Date of Patent: *Jul. 11, 2017

(54) CONCRETE PROTECTIVE AGENT, METHOD FOR REPAIRING CONCRETE STRUCTURE, IMPREGNATION INDUCING AGENT FOR CONCRETE STRUCTURE, AND DEFECT FILLING AGENT FOR CONCRETE STRUCTURE

(71) Applicant: AES Co., Ltd., Yamagata-shi, Yamagata (JP)

(72) Inventors: Yasumoto Kuriyama, Yamagata (JP); Masaaki Seya, Yamagata (JP); Yoshihisa Suzuki, Yamagata (JP); Masatoshi Abiko, Yamagata (JP)

(73) Assignee: AES CO., LTD., Yamagata-Shi, Yamagata (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/762,723

(22) PCT Filed: Jun. 3, 2015

(86) PCT No.: PCT/JP2015/065999
§ 371 (c)(1),
(2) Date: Jul. 22, 2015

(87) PCT Pub. No.: WO2015/186724
PCT Pub. Date: Dec. 10, 2015

(65) Prior Publication Data
US 2016/0264480 A1   Sep. 15, 2016

(30) Foreign Application Priority Data
Jun. 3, 2014 (JP) .................. 2014-114678

(51) Int. Cl.
| | | |
|---|---|---|
| C04B 24/04 | (2006.01) | |
| B05D 7/24 | (2006.01) | |
| B05D 5/00 | (2006.01) | |
| C04B 41/52 | (2006.01) | |
| C04B 41/70 | (2006.01) | |
| C04B 24/40 | (2006.01) | |
| B05D 3/00 | (2006.01) | |
| C25B 1/00 | (2006.01) | |
| C04B 41/00 | (2006.01) | |
| C04B 41/68 | (2006.01) | |
| C04B 22/00 | (2006.01) | |
| C04B 22/06 | (2006.01) | |
| C04B 41/50 | (2006.01) | |
| C04B 111/27 | (2006.01) | |
| C04B 111/72 | (2006.01) | |

(52) U.S. Cl.
CPC ............. *B05D 5/005* (2013.01); *B05D 7/24* (2013.01); *C04B 22/004* (2013.01); *C04B 22/06* (2013.01); *C04B 24/04* (2013.01); *C04B 24/40* (2013.01); *C04B 41/502* (2013.01); *C04B 41/5024* (2013.01); *C04B 41/5089* (2013.01); *C04B 41/52* (2013.01); *C04B 41/68* (2013.01); *C04B 41/70* (2013.01); *C25B 1/00* (2013.01); *B05D 2203/30* (2013.01); *B05D 2401/20* (2013.01); *C04B 2111/27* (2013.01); *C04B 2111/72* (2013.01)

(58) Field of Classification Search
CPC ......... C04B 24/04; C04B 24/40; C04B 3/007; C25B 1/00; B05D 5/005; B05D 7/24; B05D 2203/30; B05D 2401/20
USPC ..................... 427/140, 301, 343, 344, 397.8
See application file for complete search history.

(56) References Cited

U.S. PATENT DOCUMENTS

| | | | |
|---|---|---|---|
| 5,824,147 A | 10/1998 | Drechsler et al. | |
| 2015/0353425 A1 | 12/2015 | Kuriyama et al. | |

FOREIGN PATENT DOCUMENTS

| | | | |
|---|---|---|---|
| JP | 56-37256 A | | 4/1981 |
| JP | 08-067579 A | * | 3/1996 |
| JP | 09-511983 A | | 2/1997 |
| JP | 2004-323333 A | * | 11/2004 |
| JP | 2006-183446 A | | 7/2006 |
| JP | 2007-126309 A | | 5/2007 |
| WO | WO 2014/157545 A1 | | 10/2014 |

OTHER PUBLICATIONS

English translation of International Search Report issued in Application No. PCT/JP2015/065999, date of mailing Aug. 11, 2015 (4 pages).
Notification of Transmittal of International Search Report issued in Application No. PCT/JP2015/065999 dated Aug. 11, 2015 (2 pages).
International Search Report issued in Application No. PCT/JP2015/065999 dated Aug. 11, 2015 (5 pages).
Written Opinion of International Searching Authority issued in Application No. PCT/JP2015/065999 dated Aug. 11, 2015 (6 pages).
Search Report of European Patent Office issued in Application No. 15802455 dated Nov. 29, 2016 (4 pages).

* cited by examiner

*Primary Examiner* — William Phillip Fletcher, III
(74) *Attorney, Agent, or Firm* — Flynn, Thiel, Boutell & Tanis, P.C.

(57) ABSTRACT

A concrete protective agent including an alkali metal-containing silicate and an alkaline electrolyzed water. A concrete protective agent including an alkali metal-containing silicate and silicon dioxide. Examples of the alkali metal-containing silicate include sodium silicate, potassium silicate and lithium silicate. By supplying the concrete protective agent to a concrete structure, the repair of the concrete structure can be performed. A concrete repairing agent having a significant repairing effect as compared with conventional concrete repairing agents.

4 Claims, 6 Drawing Sheets

CONCRETE PROTECTIVE AGENT, METHOD FOR REPAIRING CONCRETE STRUCTURE, IMPREGNATION INDUCING AGENT FOR CONCRETE STRUCTURE, AND DEFECT FILLING AGENT FOR CONCRETE STRUCTURE

TECHNICAL FIELD

The present invention relates to a concrete protective agent, a method for repairing a concrete structure, an impregnation inducing agent for a concrete structure, and a defect filling agent for a concrete structure.

BACKGROUND ART

Concrete is high in resistance to various environments, and moreover, strongly alkaline, and hence is used for concrete structures. Due to the strong alkalinity of concrete, a passive film is formed on the surface of reinforcing bars placed inside a concrete structure, and hence the reinforcing bars are protected from the corrosion due to, for example, water or chlorine from the outside. Consequently, concrete structures are known as structures high in durability.

However, concrete structures having been considered to have high durability are degraded in durability due to, for example, neutralization, salt damage, frost damage or alkali-aggregate reaction, and doubt comes to be cast on the service life of concrete structures as structures. Here, the degradation of a concrete structure is considered to be caused by the penetration of the degradation causing substances (for example, water, carbon dioxide and chlorine) into the inside of the concrete structure through the capillaries, pores, or cracks present in the concrete structure.

Accordingly, concrete protective agents have been proposed in order to repair such degraded concrete structures. For example, Patent Literature 1 discloses a concrete protective agent including two or more alkali metal compounds selected from sodium silicate, potassium silicate and lithium silicate. According to the concrete protective agent described in Patent Literature 1, by the filling with a C—S—H gel, the capillaries and the like to work as the paths of the degradation causing substances can be blocked, and consequently, the degradation of concrete structures such as the neutralization, salt damage, frost damage or alkali-aggregate reaction can be prevented.

CITATION LIST

Patent Literature

[Patent Literature 1]: Japanese Patent Laid-Open No. 2004-323333

SUMMARY OF INVENTION

Technical Problem

However, when the concrete protective agent of Patent Literature 1 is used, a certain repairing effect is obtained, but the degree of the repairing effect is not sufficient. Because of this, even when the concrete protective agent of Patent Literature 1 is used, the penetration of degradation causing substances from the outside into concrete structures results in the degradation of the durability of concrete structures due to the degradation such as the neutralization, salt damage, frost damage or alkali-aggregate reaction.

In view of such circumstances as described above, the present invention intends to provide a concrete protective agent. The present invention also intends to provide a method for repairing a concrete structure using the concrete protective agent, an impregnation inducing agent for a concrete structure, and a defect filling agent for a concrete structure.

Solution to Problem

According to an aspect of the present invention, the concrete protective agent of the present invention includes an alkali metal-containing silicate and an alkaline electrolyzed water.

According to another aspect of the present invention, the concrete protective agent of the present invention includes an alkali metal-containing silicate and silicon dioxide.

The concrete protective agent of the present invention preferably includes an alkaline electrolyzed water. The alkali metal preferably includes at least one of sodium, potassium, and lithium.

The method for repairing a concrete structure of the present invention includes a modifying agent supply step of supplying a concrete modifying agent to a concrete structure; and a protective agent supply step of supplying the concrete protective agent to the concrete structure, the protective agent supply step being performed after the modifying agent supply step; wherein the concrete modifying agent includes an alkaline electrolyzed water and a calcium ion.

The impregnation inducing agent for a concrete structure of the present invention includes an alkaline electrolyzed water.

The defect filling agent for a concrete structure of the present invention includes silicon dioxide.

Advantageous Effects of Invention

According to the present invention, a significant repairing effect can be imparted to concrete structures as compared with conventional concrete repairing agents.

DESCRIPTION OF EMBODIMENTS

Hereinafter, the embodiments of the present invention are described with reference to the accompanying drawings.

(Concrete Protective Agent)

The concrete protective agent includes an alkali metal silicate, silicon dioxide and an alkaline electrolyzed water.

In the concrete modifying agent, a prescribed additive(s) may be included according to the use thereof.

(Alkali Metal Silicate)

The alkali metal silicate is used mainly for the purpose of producing a C—S—H gel in a concrete structure through the reaction with calcium ion. Examples of the alkali metal silicate include sodium silicate, potassium silicate and lithium silicate.

Sodium silicate absolutely facilitates the occurrence of the production reaction of the C—S—H gel. Accordingly, when a concrete protective agent including only sodium silicate as the alkali metal silicate is applied to a concrete structure, the production reaction of the C—S—H gel occurs before the penetration of the concrete protective agent from the applied surface in the depth direction. Consequently, the protective effect of the concrete structure is limited to the vicinity of the surface. On the other hand, potassium silicate allows the production reaction of the C—S—H gel to occur slowly. Accordingly, the alkali metal silicate preferably includes potassium silicate as well as sodium silicate. Because of this, the protective effect of the concrete structure reaches not only the vicinity of the surface but also the inside, and hence the long service life of the concrete structure is achieved. For example, the mixing ratio (weight ratio) of sodium silicate to potassium silicate in the alkali metal silicate is preferably 2:1.

Figure 1:
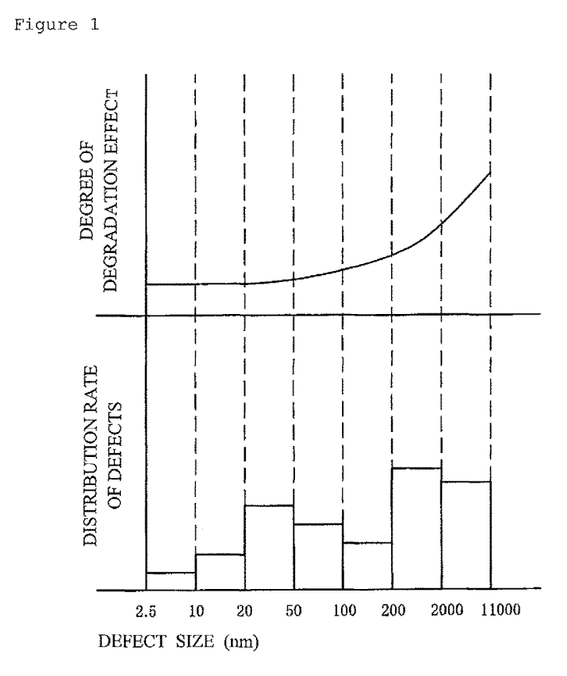
FIG. 1 is an illustrative graph for illustrating changes in defect distribution rate and the degree of the degradation effect as a function of defect size, for the defects present in a concrete structure.

Among the defects (for example, capillaries, pores and cracks) present in a concrete structure, relatively large defects tend to induce the degradation of the concrete structure as compared with relatively small defects (see FIG. 1). In particular, defects having a size of 20 nm or more induce the degradation of the concrete structure, and as the size of the defects increases, the defects tend to induce the degradation of the concrete structure. Accordingly, the concrete protective agent is preferably capable of certainly filling relatively large defects and capable of blocking the paths of the degradation causing substances. For this purpose, the particle size of the alkali metal silicate is preferably 1 nm or more and 100 nm or less. When the particle size of the alkali metal silicate exceeds 100 nm, dense filling in the defects is insufficient to thereby cause, in the defects, the occurrence of the voids to be the penetration paths of the degradation causing substances.

(Silicon Dioxide)

Figure 2:
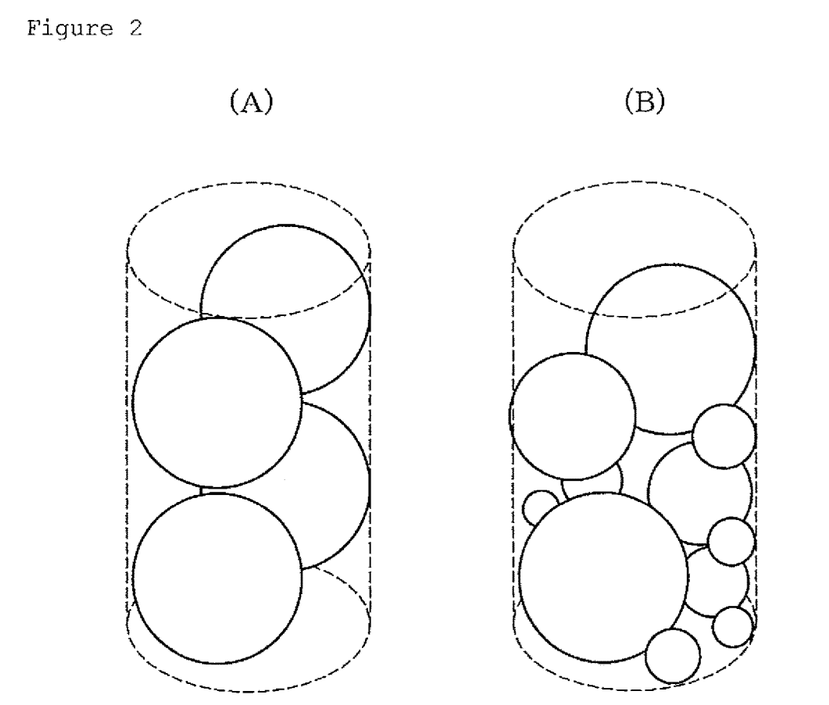
FIG. 2 is an illustrative diagram for illustrating the state of aggregates filled in a defect present in a concrete structure.

Silicon dioxide is used mainly for the purpose of obtaining the function to fill the defects of a concrete structure and the function to promote the aggregation of the alkali metal silicate. The aggregation function of silicon dioxide collects the alkali metal silicate with silicon dioxide as nuclei and forms aggregates. As compared with the aggregates having a uniform size (see FIG. 2(A)), the aggregates having random sizes (see FIG. 2(B)) are higher in the filling efficiency for the defects of the concrete structure, namely, narrow the paths of the degradation causing substances. Consequently, the protective effect of the concrete structure is improved. Any type of silicon dioxide that achieves the above-described function may be adopted without being particularly limited; however, silicon dioxide is preferably amorphous silica, in particular, dry silica. Examples of such silica include REOLOSIL Hydrophilic CP, QS series (CAS No. 7631-86-9, manufactured by Tokuyama Corp.).

The size of the aggregates of the alkali metal silicate depends on the size of the silicon dioxide particles to serve as nuclei. In other words, the larger is the size of the silicon dioxide particles to serve as nuclei, the larger is the size of the aggregates of the alkali metal silicate. On the contrary, the smaller is the size of the silicon dioxide particles to serve as nuclei, the smaller is the size of the aggregates of the alkali metal silicate.

Accordingly, in order to achieve the function to fill the defects of a concrete structure due to silicon dioxide itself, the particle size of silicon dioxide is preferably 1 nm or more and 50 nm or less. Additionally, in order to perform denser filling by using the function to promote the aggregation of the alkali metal silicate, the particle size of silicon dioxide is preferably randomly distributed over a wider range (for example, 1 nm or more and 250 nm or less). When the particle size of silicon dioxide is less than 1 nm, the solubility comes to be high like liquid glass, which is not preferred. When the particle size of silicon dioxide exceeds 250 nm, no dense filling can be performed, which is not preferred.

(Alkaline Electrolyzed Water)

The alkaline electrolyzed water preferably has a pH of 11 or more. The upper limit of the pH of the alkaline electrolyzed water may be, without particularly limited to, a degree of pH not to cause alkali-aggregate reaction in the case where the alkaline electrolyzed water is supplied to a concrete structure, namely, may fall within a range of the described total amount of the concrete alkali (3.0 kg/m$^3$ or less in terms of Na$_2$O).

In addition, the alkaline electrolyzed water more easily penetrates into a concrete structure as compared with common water. The high penetrability of the alkaline electrolyzed water is inferred to be due to the smaller ion radius of a hydroxide ion as compared with the size of a water molecule. The effective components (dispersoid such as alkali metal silicate or silicon dioxide, and other additives) included in the alkaline electrolyzed water more easily penetrate into a concrete structure, as compared to the case where these effective components are included in common water. Specifically, by including at least prescribed effective components and the alkaline electrolyzed water, the effective components can be supplied to the inside of a concrete structure, as the concrete protective agent.

Here, when the ratio ($=X_{Cl}/X_{OH}$) of the chloride ion concentration $X_{Cl}$ to the hydroxide ion concentration $X_{OH}$ exceeds a predetermined value, the corrosion of the reinforcing bars is known to start. By the above-described application of the concrete protective agent, a large amount of hydroxide ions is supplied to a concrete structure, and consequently, a large amount of hydroxide ions is present in the concrete structure. When chloride ions penetrate into the concrete structure in which a large amount of hydroxide ions is present, namely, the concrete structure in which the alkalinity strength is increased, the ratio of the concentration of chloride ions to the concentration of hydroxide ions is suppressed to be low. Accordingly, in the concrete structure in which the alkalinity strength is increased, even when chloride ions penetrate into the concrete structure, the concentration of chloride ions hardly exceeds the limiting value at which the corrosion of reinforcing bars starts, and consequently, the corrosion of the reinforcing bars can be suppressed.

The solubility of calcium ions in the alkaline electrolyzed water is higher than the solubility of calcium ions in common water. For example, the solubility of calcium ions per 100 g of the alkaline electrolyzed water at 25° C. is, for example, 5.0 g, and is higher than the solubility (0.17 g) of calcium ions in the case where calcium hydroxide is dissolved in 100 g of water (25° C., pH 7). The supply of such a concrete protective agent including an alkaline electrolyzed water to a concrete structure promotes the production reaction of the C—S—H gel.

Here, the promotion of the production of the C—S—H gel is inferred as follows. Owing to the function to promote the dissolution of calcium ions due to the alkaline electrolyzed water, the calcium ions included in the concrete structure are taken in the alkaline electrolyzed water. The calcium ions taken in the alkaline electrolyzed water contribute to the production of the C—S—H gel.

Any proportions of the individual components in the concrete protective agent that allow the functions of the individual components to be achieved may be adopted, without being particularly limited. The preferable ranges of the proportions of the individual components are as follows. The proportion of the alkali metal silicate in the concrete protective agent is preferably 15% by weight or more and 50% by weight or less and more preferably 20% by weight or more and 40% by weight or less. The lower limit of the proportion of silicon dioxide in the concrete protective agent is preferably 0.5% by weight or more. On the other hand, the upper limit of the proportion of silicon dioxide is preferably of the order that causes no occurrence of exterior appearance failure (degradation of design) of a concrete structure. For example, the upper limit is preferably 10% by weight or less, more preferably 5% by weight or less and furthermore preferably 3% by weight or less. The proportion of the alkaline electrolyzed water in the concrete protective agent is preferably 50% by weight or more and 85% by weight or less and more preferably 60% by weight or more and 80% by weight or less. When the function of silicon dioxide is not needed, silicon dioxide can be omitted as a component of the concrete protective agent. Similarly, when the function of the alkaline electrolyzed water is not needed, water may be used in place of the alkaline electrolyzed water.

The function of the concrete protective agent is described.

When the concrete protective agent is supplied to a concrete structure, by the reaction with calcium ion, the C—S—H gel (hereinafter, referred to as wet gel) is produced in the concrete structure. The wet gel can block the defects to be the paths for the degradation causing substances. Accordingly, it is possible to prevent the degradation (such as neutralization, salt damage, frost damage or alkali-aggregate reaction) of the concrete structure due to the presence of the defects. The wet gel is converted into a dry gel by the decrease of the water content. The dry gel is converted into the wet gel having fluidity by the contact with water or moisture. In this way, in a concrete structure in which a dry gel is present, even when water or moisture penetrates from the outside, the water or the moisture is brought into contact with the wet gel to be taken into the wet gel, and consequently, the penetration of water or moisture from the outside can be prevented. Additionally, the wet gel has fluidity, and hence can display a self-repairing function such as filling the subsequently generated defects (such as cracks).

The concrete protective agent includes silicon dioxide, and hence in the wet gel produced by the concrete protective agent, particles (aggregates of alkali metal silicate and silicon dioxide) having various sizes are present (see FIG. 2(B)). Accordingly, defects such as capillaries, pores and cracks are certainly filled, the paths of the degradation causing substances can be blocked, and consequently, the degradation of a concrete structure can be prevented.

Additionally, the concrete protective agent includes the alkaline electrolyzed water, and hence easily penetrates into a concrete structure. Accordingly, the filling of the defects in a concrete structure can be performed certainly in a short time. Yet additionally, the concrete protective agent includes the alkaline electrolyzed water, and hence a large amount of hydroxide ions is present in the concrete structure. Consequently, the corrosion of the reinforcing bars in the concrete structure can be suppressed. The easy penetration of the concrete protective agent due to the alkaline electrolyzed water is displayed even when the alkali metal silicate included in the concrete protective agent is only sodium silicate.

Next, the method for manufacturing the concrete protective agent is described.

The method for manufacturing the concrete protective agent includes an electrolysis step and an addition step. In the electrolysis step, water is electrolyzed to produce an alkaline electrolyzed water and an acidic electrolyzed water. In the electrolysis step, manufacturing equipment 2 shown in FIG. 3 (described later) can be used. In the addition step, the prescribed components (alkali metal silicate and silicon dioxide) are added to the alkaline electrolyzed water.

In the above-described embodiment, the repair of a concrete structure is performed by the protective agent supply step of supplying the concrete protective agent to the concrete; however, the present invention is not limited to this, and the repair of a concrete structure using a repairing agent for a concrete structure and a concrete modifying agent in combination may also be performed.

(Concrete Modifying Agent)

The concrete modifying agent is an alkaline electrolyzed water including calcium ions dissolved therein. A prescribed solute(s) may also be added to the alkaline electrolyzed water, if necessary.

The alkaline electrolyzed water preferably has a pH of 11 or more. The upper limit of the pH of the alkaline electrolyzed water may be, without particularly limited, a degree of pH not to cause alkali-aggregate reaction in the case where the alkaline electrolyzed water is supplied to a concrete structure, namely, may fall within a range of the described total amount of the concrete alkali (3.0 kg/m$^3$ or less in terms of $Na_2O$). The solubility of calcium ions per 100 g of the alkaline electrolyzed water at 25° C. is, for example, 5.0 g, and is higher than the solubility (0.17 g) of calcium ions in the case where calcium hydroxide is dissolved in 100 g of water (25° C., pH 7). In other words, the alkaline electrolyzed water acts as a calcium ion concentration increasing agent in the modifying agent. For example, the calcium ion concentration in the alkaline electrolyzed water is preferably 10 mg/L or more. The alkaline electrolyzed water acts as a concentration increasing agent for the cation (for example, an alkali metal ion such as a lithium ion, a sodium ion or a potassium ion) in a prescribed solution as well as the concentration increasing agent for the calcium ions in the modifying agent.

(Method for Repairing Concrete Structure)

The method for repairing a concrete structure includes a modifying agent supply step of supplying the concrete modifying agent to the concrete structure, and a protective agent supply step of supplying the concrete protective agent to the concrete. In the modifying agent supply step, the alkaline electrolyzed water including calcium ions is applied as the concrete modifying agent to the concrete structure. In the protective agent supply step, the above-described concrete protective agent is applied as the concrete modifying agent to the concrete structure. In each of the modifying agent supply step and the protective agent supply step, any method may be adopted in which the prescribed chemical preparation is brought into contact with the concrete structure, without being particularly limited, and examples of such a method include a method in which the prescribed chemical preparation is sprayed with a spray.

By the method for repairing a concrete structure, calcium hydroxide, the alkali metal silicate and water are allowed to react with each other in the concrete, to produce a gel-like calcium silicate (C—S—H gel). The produced calcium silicate makes dense the surface layer portion of the concrete structure, can prevent the penetration of the degradation causing substance from the outside, and hence can improve the durability of the concrete structure.

For example, in a concrete structure in a degraded state (for example, a concrete of less than pH 11, or a concrete of an elapsed time of about 10 years or more from being newly constructed), the calcium ions included at the time of being newly constructed are almost lost by, for example, the penetration of the degradation causing substance(s) from the outside. As a result of the application of the concrete protective agent to the concrete structure as it is in such a degraded state, because no sufficient amount of calcium ions is present, calcium silicate is not produced, or the production of calcium silicate takes a long time.

Accordingly, the modifying agent supply step is performed for the concrete structure in a degraded state, in advance of the protective agent supply step. In this way, calcium ions can be replenished to the concrete structure. The application of the concrete protective agent to the concrete structure replenished with calcium ions allows the replenished calcium ions to contribute to the production of calcium silicate. Consequently, the application of the concrete modifying agent facilitates the production of calcium silicate in the concrete structure.

Additionally, the promotion of the production of calcium silicate requires a large amount of calcium ions. The concrete modifying agent is higher in the calcium ion concentration than usual calcium hydroxide aqueous solutions, and hence starts the reaction with the concrete protective agent in a short time.

In the above described embodiment, for the purpose of repairing a concrete structure, the application of the concrete modifying agent and the application of the concrete protective agent are performed in this order to the concrete structure; however, this combination may be repeated a plurality of times.

(Manufacturing Equipment for Concrete Modifying Agent)

Next, the manufacturing equipment for the concrete modifying agent is described.

Figure 3:
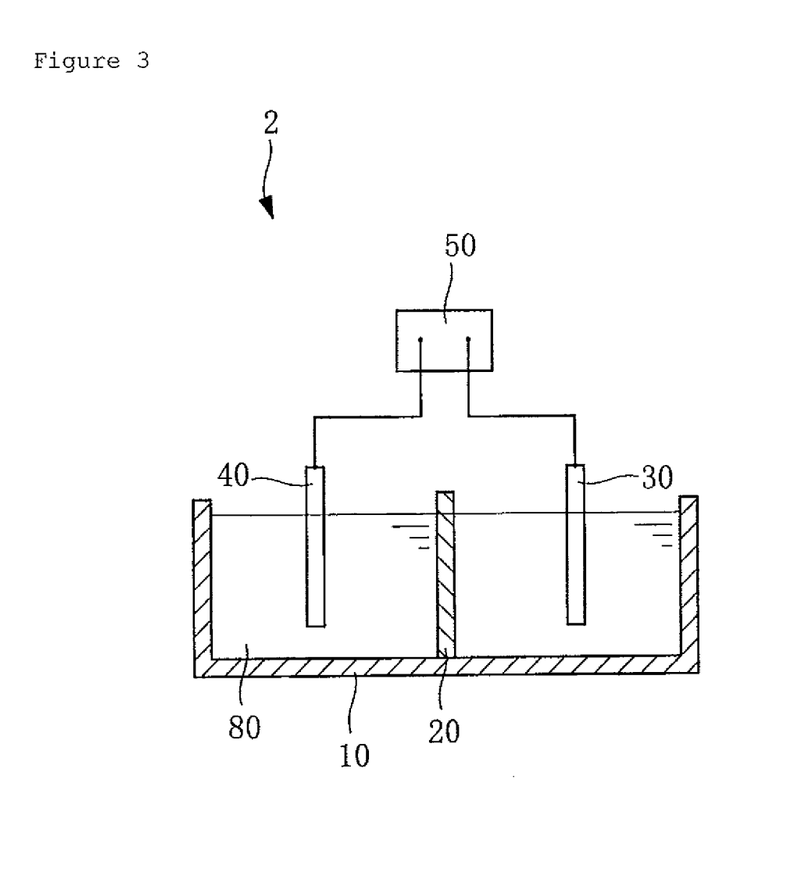
FIG. 3 is an illustrative diagram for illustrating the outline of manufacturing equipment for a concrete modifying agent.

As shown in FIG. 3, the manufacturing equipment 2 for the concrete modifying agent is provided with a water tank 10, an ion exchange membrane 20, an anode 30, a cathode 40, and an electric power supply 50 applying a predetermined voltage across the anode 30 and the cathode 40.

In the water tank 10, tap water including a calcium preparation dissolved therein is stored. Examples of the calcium preparation include: water-soluble calcium-containing compounds (calcium salts such as calcium lactate, calcium gluconate, and phosphoryl oligosaccharides of calcium).

The internal space of the water tank 10 is partitioned with an ion-exchange membrane 20, and the anode 30 and the cathode 40 are installed respectively in the two spaces partitioned with the ion-exchange membrane 20. Subsequently, by using an electric power supply 50, a predetermined voltage is applied across the anode 30 and the cathode 40 to perform electrolysis. By the electrolysis, hydrogen is generated on the side of the cathode 40, and at the same time, the alkaline electrolyzed water 80 including calcium ions dissolved therein is produced. On the other hand, on the side of the anode 30, acidic water including lactic acid, a chloride ion, a hydrogen carbonate ion and the like are produced as isolated from the alkaline electrolyzed water.

The calcium ion-containing alkaline electrolyzed water thus obtained can be used as the concrete modifying agent. Such an alkaline electrolyzed water does not contain substances harmful for human body and environmental pollutants, hence the operations are safe for human body and simple, and the alkaline electrolyzed water can be used without performing any specific preparation.

Example 1

Experiments 1 to 5 were performed by the following methods.

(Preparation for Experiments 1 and 2)

Hereinafter, the procedures of Experiments 1 and 2 are described.

Two samples of a concrete plate were prepared; a protective agent A was applied to one of the samples and a protective agent B was applied to the other of the samples. Hereinafter, the sample to which the protective agent A was applied is referred to as sample A, and the sample to which the protective agent B was applied is referred to as sample B. The amount applied was 0.25 liter/m$^2$, for each of the samples. The curing time was 14 days for each of the samples.

(Samples)

Each of the samples of the concrete plate was formed as a 300-mm square plate having a thickness of 50 mm. The composition of the concrete plate was such that the ratio of cement:sand=1:3, and the water-to-cement ratio was 65%.

(Protective Agent A)

The protective agent A was an inorganic colloidal sol including the following components.

Sodium silicate: 15.7% by weight
Potassium silicate: 4.3% by weight
Alkaline electrolyzed water: 79.7% by weight
Silicon dioxide: 0.3% by weight (Protective Agent B)

The protective agent B was an inorganic colloidal sol including the following components (product name: RC Guard, ABC Trading Co., Ltd.).

Sodium silicate: 10 to 20% by weight
Potassium silicate: 20 to 40% by weight
Water ($H_2O$): 40 to 70% by weight (Experiment 1)

Figure 4:
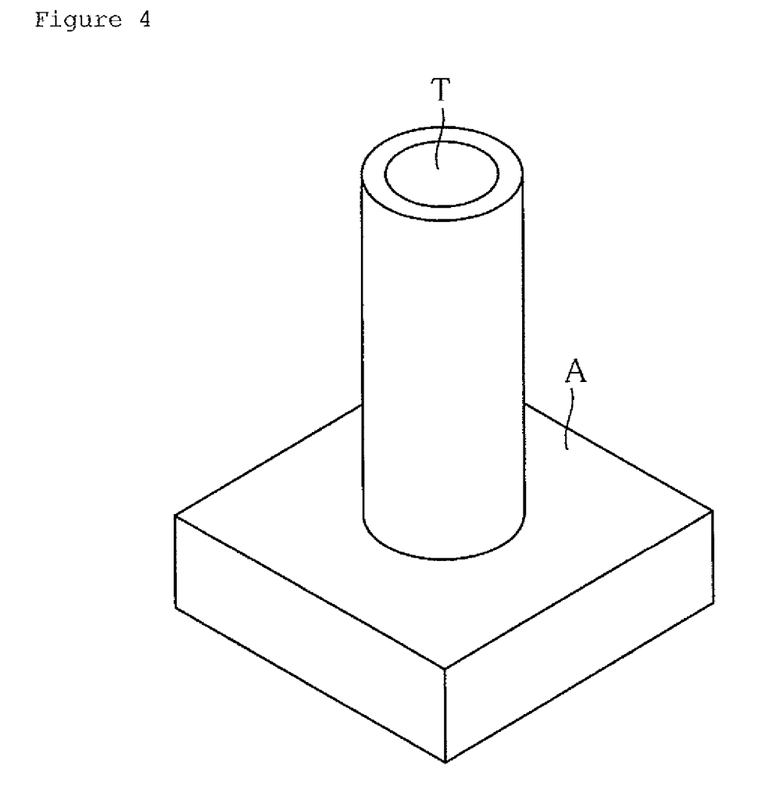
FIG. 4 is an illustrative diagram for illustrating the outline of a waterproof effect test.

As shown in FIG. 4, a measuring tube T was stood on sample A and fixed with a sealant (see FIG. 7). Subsequently, water was placed in the measuring tube T. The water height was 5 mm. In order to prevent the evaporation, paraffin was placed on the surface of the water in the measuring tube T, and the test was started. At predetermined elapsed times from the start of the test, changes in water height were examined. Table 1 shows changes in water height at the elapsed times. The environment in which the test was performed was such that the temperature was 23±2° C. and the humidity was 50±5%.

(Experiment 2)

Experiment 2 was performed in the same manner as in Experiment 1 except that sample B was used in place of sample A.

Table 1 shows the results of Experiments 1 and 2.

TABLE 1

| Elapsed time (hr) | Decrease of water height | |
|---|---|---|
| | Experiment 1 Sample A | Experiment 2 Sample B |
| 1 | No change | 2 mm |
| 2 | No change | 5 mm |
| 5 | No change | 8 mm |
| 7 | No change | 10 mm |
| 10 | 1 mm | 15 mm |
| 24 | 1 mm | 20 mm |
| 36 | 2 mm | 32 mm |
| 48 | 2 mm | 45 mm |
| 60 | 2 mm | 45 mm |
| 72 | 2 mm | 45 mm |

(Experiment 3)

A sample of a concrete plate to which the protective agent A was applied (hereinafter, referred to as sample C) and a sample of the concrete plate to which nothing was applied (hereinafter, referred to as sample D) were prepared. The amount of the protective agent A applied was 0.25 liter/m$^2$. The curing time was 14 days.

The sample of the concrete plate was a cube of 100 mm on a side; the composition of the concrete was such that the nominal strength=21, the slump=8, the maximum dimension of the coarse aggregates=25, and the water-to-cement ratio was 65%.

Figure 5:
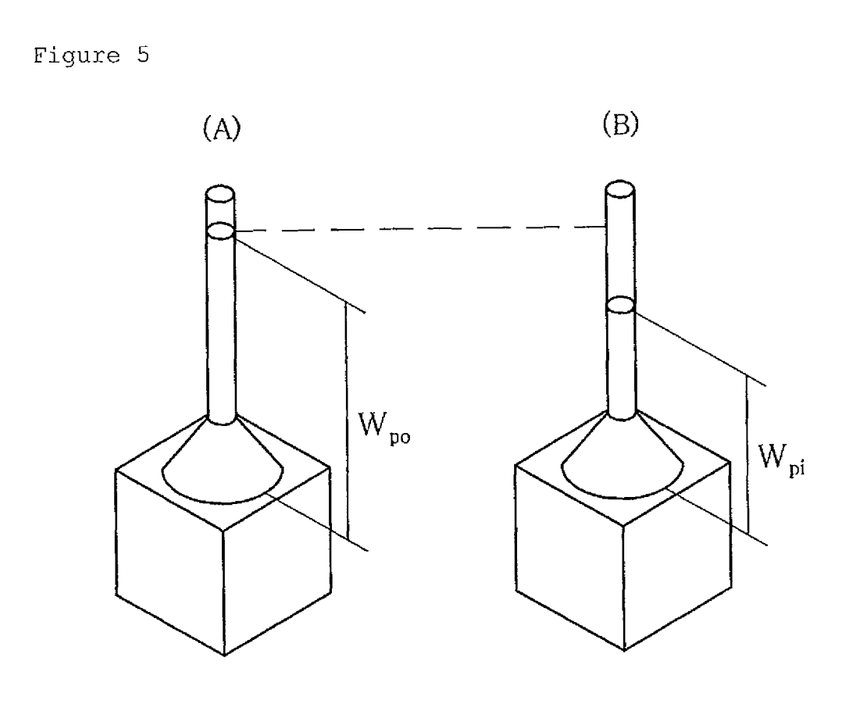
FIG. 5 is an illustrative diagram for illustrating the outline of a water penetration test.

For samples C and D (three specimens for each sample), a test of the amount of water penetrated was performed. The test of the amount of water penetrated is a test described in "Test methods of surface penetrants for concrete structures (Draft) (JSCE-K571-2005)." The height of the hydraulic head $W_{pi}$ (unit: mm) after 7 days from the start of the test was read, and the amount of water penetrated was calculated from the difference from the height $W_{po}$ (unit: mm) before the test (see FIG. 5). The environment in which the test of the amount of water penetrated was performed was such that the temperature was 23±2° C. and the humidity was 50±5%.

From the measurement values of the test of the amount of water penetrated, the water penetration ratio was determined on the basis of the following formula.

Water penetration ratio=amount of water penetrated of sample $C$/amount of water penetrated of sample $D$×100

Table 2 shows the results of Experiment 3.

TABLE 2

| | Sample C | | | Sample D | | |
|---|---|---|---|---|---|---|
| | (1) | (2) | (3) | (1) | (2) | (3) |
| Water height at start of test $W_{po}$ | 5.00 | 5.00 | 5.00 | 5.00 | 5.00 | 5.00 |
| Amount of water added after start of test (water height) | 3.00 | 3.00 | 3.00 | 21.00 | 21.00 | 21.00 |
| Water height after 7 days from start of test $W_{pi}$ | 3.75 | 3.00 | 3.25 | 2.50 | 2.15 | 2.80 |
| Amount of water penetrated $W_p$ (ml) | 4.25 | 5.00 | 4.75 | 23.85 | 23.20 | 23.20 |
| Amount of water penetrated (average) | | 4.67 | | | 23.52 | |
| Water penetration ratio (%) | | | | 19.84 | | |

(Experiment 4)

A sample of a concrete plate to which the protective agent A was applied (hereinafter, referred to as sample E) and a sample of the concrete plate to which nothing was applied (hereinafter, referred to as sample F) were prepared. The sample of the concrete plate was a cube of 100 mm on a side; the composition of the concrete was such that the nominal strength=21, the slump=8, the maximum dimension of the coarse aggregates=25, and the water-to-cement ratio was 65%. The amount of the protective agent A applied was 0.25 liter/m$^2$. The curing time was 14 days.

For samples E and F (three specimens for each sample), an accelerated neutralization test was performed for 28 days in an environment in which the temperature was 20±2° C., the humidity was 60±5%, and the carbon dioxide concentration was 5±0.2%. The accelerated neutralization test is a test described in "Test methods of surface penetrants for concrete structure (Draft) (JSCE-K571-2005)."

Figure 6:
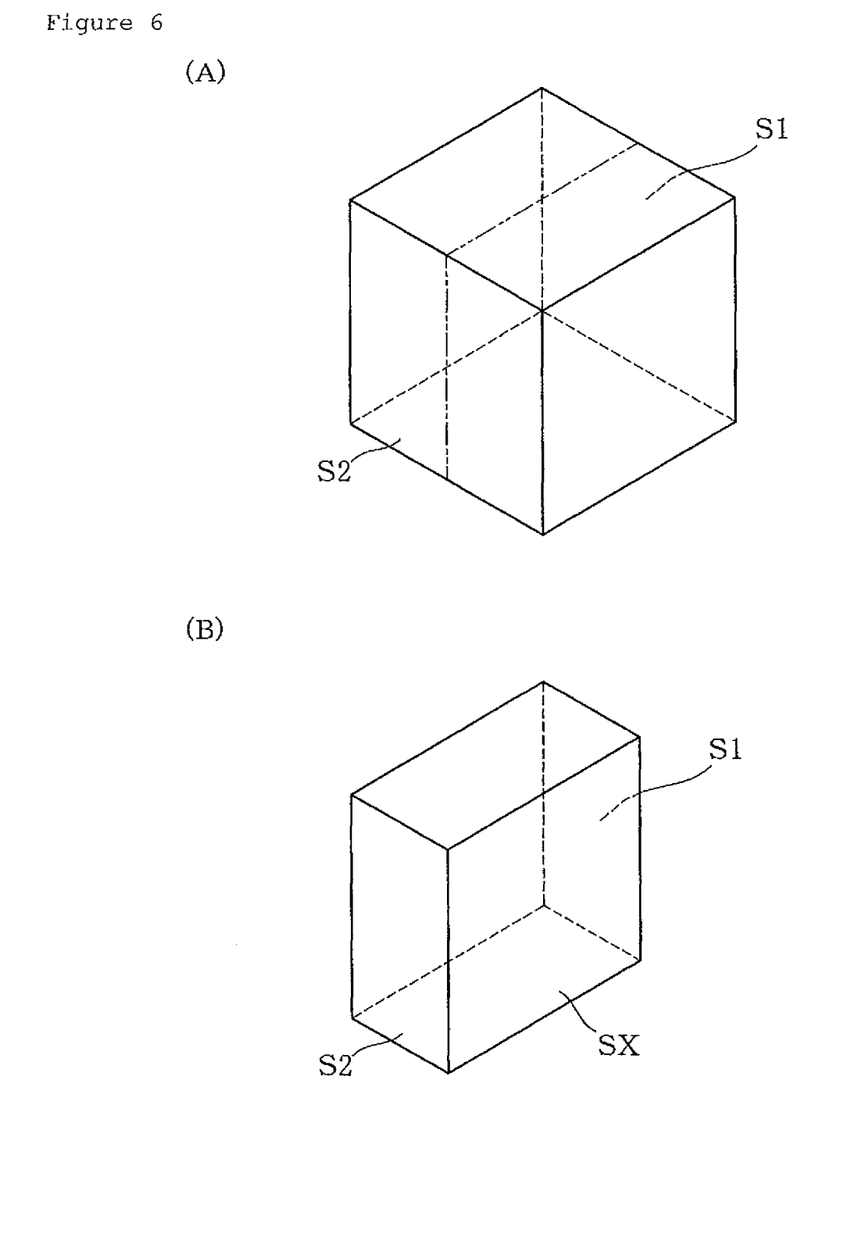
FIG. 6 is an illustrative diagram for illustrating the outline of an accelerated neutralization test.

After the accelerated neutralization test, samples E and F were each fractured in such away that the impregnation surface S1 of each of samples E and F was bisected; and in each of samples E and F, the neutralization depths from the impregnation surface S1 of the fracture surface SX and the surface S2 (test surface) facing the impregnation surface S1 were measured (see FIG. 6). Then, the neutralization depth ratio was determined on the basis of the following formula.

Neutralization depth ratio=neutralization depth of sample $E$/neutralization depth of sample $F$×100

Table 3 shows the results of Experiment 4. The measurement positions A1 to A3 in the table are the widthwise center position, and the positions sifted from the widthwise center position toward left and right by 25 mm, respectively, in the sample of the concrete plate.

TABLE 3

| | | Sample E | | | Sample F | | |
|---|---|---|---|---|---|---|---|
| | | (1) | (2) | (3) | (1) | (2) | (3) |
| Neutralization depth (mm) | Measurement position A1 | 5.10 | 4.90 | 4.80 | 15.50 | 15.60 | 15.20 |
| | Measurement position A2 | 4.70 | 4.80 | 5.10 | 16.50 | 15.80 | 16.20 |
| | Measurement position A3 | 4.90 | 5.00 | 5.00 | 15.40 | 16.30 | 15.60 |
| Average neutralization depth (mm) | | | 4.90 | | | 15.80 | |
| Neutralization depth ratio (%) | | | | | 31.18 | | |

(Experiment 5)

The concrete modifying agent was prepared as follows. In 1000 ml of tap water (25° C.), 50 g of calcium lactate (Musashino Chemical Laboratory, Ltd.) was dissolved. As the tap water, the tap waters obtained at the water sampling site Nos. 5 to 7 in Table 4 were used. The water thus obtained was poured into a water tank 10 of manufacturing equipment 2 for the concrete modifying agent shown in FIG. 3 and subjected to electrolysis; the alkaline electrolyzed water obtained by the electrolysis was adopted as the concrete modifying agent. On the basis of ICP atomic emission spectrophotometry (JIS K0101 No. 49), the amount of Ca ions in the concrete modifying agent was measured, and the amount of Ca ions in the concrete modifying agent was found to be 2.5×10$^5$ mg/L.

TABLE 4

Water quality test results
(Test results of standard items; test date: May, 2013)

No1 (1/3)

| | | Water sampling site No. | | | | | | |
|---|---|---|---|---|---|---|---|---|
| | | 1 | 2 | 3 | 4 | 5 | 6 | 7 |
| Water sampling site | | | Misaki Water Purification Plant (Kirihata) | | | (Jonan-machi) | (Iizuka-machi) | |
| Water Type | | Raw Water | Coagulation sedimentation treated water | Biological activated carbon treated water | Purified water | Hydrant water | Hydrant water | Hydrant water |
| Date and time of water sampling | | 13th day, 10:20 | 13th day, 10:30 | 13th day, 10:00 | 13th day, 10:40 | 13th day, 9:20 | 13th day, 9:05 | 13th day, 9:20 |
| Weather (previous day/sampling day) | | Fine/fine | Fine/fine | Fine/fine | Fine/fine | Fine/fine | Fine/fine | Fine/fine |
| Air temperature (° C.) | | 22.6 | 22.6 | 22.6 | 22.6 | 19.6 | 18.3 | 19.4 |
| Water temperature (° C.) | | 11.4 | 12.8 | 11.6 | 11.2 | 11.5 | 11.7 | 12.0 |
| 1 | General bacteria | CFU/ml | | | | 0 | 0 | 0 | 0 |
| 2 | Escherichia coli | MPN/100 ml | | | | Not detected | Not detected | Not detected | Not detected |
| 3 | Cadmium and its compounds | mg/l | <0.0003 | | | <0.0003 | | | |
| 4 | Mercury and its compounds | mg/l | | | | | | | |
| 5 | Selenium and its compounds | mg/l | <0.001 | | | <0.001 | | | |
| 6 | Lead and its compounds | mg/l | <0.001 | | | <0.001 | | | |
| 7 | Arsenic and its compounds | mg/l | <0.001 | | | <0.001 | | | |
| 8 | Hexavalent chromium and its compounds | mg/l | <0.001 | | | <0.001 | | | |
| 9 | Cyanide ion and cyan chloride | mg/l | | | | | | | |
| 10 | Nitrate nitrogen and nitrite nitrogen | mg/l | | | | | 0.35 | 0.34 | 0.32 |
| 11 | Fluorine and its compounds | mg/l | | | | | <0.08 | <0.08 | <0.08 |
| 12 | Boron and its compounds | mg/l | <0.01 | | | <0.01 | | | |
| 13 | Carbon tetrachloride | mg/l | | | | | | | |
| 14 | 1,4-Dioxane | mg/l | | | | | | | |
| 15 | cis-1,2-Dichloroethylene and trans-1,2-dichloroethylene | mg/l | | | | | | | |
| 16 | Dichloromethane | mg/l | | | | | | | |
| 17 | Tetrachloroethylene | mg/l | | | | | | | |
| 18 | Trichloroethylene | mg/l | | | | | | | |
| 19 | Benzene | mg/l | | | | | | | |
| 20 | Chloric acid | mg/l | | | | | <0.06 | <0.06 | <0.06 |
| 21 | Chloroacetic acid | mg/l | | | | | | | |
| 22 | Chloroform | mg/l | | | | | | | |
| 23 | Dichloroacetic acid | mg/l | | | | | | | |
| 24 | Dibromochloromethane | mg/l | | | | | | | |
| 25 | Bromic acid | mg/l | | | | | <0.001 | <0.001 | <0.001 |
| 26 | Total trihalomethane | mg/l | | | | | | | |
| 27 | Trichloroacetic acid | mg/l | | | | | | | |
| 28 | Bromodichloromethane | mg/l | | | | | | | |
| 29 | Bromoform | mg/l | | | | | | | |

TABLE 4-continued

Water quality test results
(Test results of standard items; test date: May, 2013)

No1 (1/3)

| | | | | | | | | | |
|---|---|---|---|---|---|---|---|---|---|
| 30 | Formaldehyde | mg/l | | | | | | | |
| 31 | Zinc and its compounds | mg/l | <0.01 | | | <0.01 | | | |
| 32 | Aluminum and its compounds | mg/l | 0.27 | 0.05 | | 0.03 | | | |
| 33 | Iron and its compounds | mg/l | 0.44 | <0.01 | | <0.01 | | | |
| 34 | Copper and its compounds | mg/l | <0.01 | | | <0.01 | | | |
| 35 | Sodium and its compounds | mg/l | | | | | 9.2 | 8.9 | 8.4 |
| 36 | Manganese and its compounds | mg/l | 0.027 | 0.008 | | <0.001 | | | |
| 37 | Chloride ion | mg/l | | | | | 11 | 11 | 10 |
| 38 | Calcium, magnesium and the like (hardness) | mg/l | | | | | 16 | 16 | 16 |
| 39 | Evaporation residue | mg/l | | | | | | | |
| 40 | Anionic surfactants | mg/l | | | | | | | |
| 41 | Geosmin | mg/l | 0.000002 | | | <0.000001 | <0.000001 | <0.000001 | 0.000001 |
| 42 | 2-Methyl-isoborneol | mg/l | <0.000001 | | | <0.000001 | <0.000001 | <0.000001 | <0.000001 |
| 43 | Nonionic surfactants | mg/l | | | | | | | |
| 44 | Phenols | mg/l | | | | | | | |
| 45 | Organic matter (content of total organic carbon (TOC)) | mg/l | 1.5 | 0.5 | 0.2 | 0.3 | 0.2 | 0.3 | 0.2 |
| 46 | pH value | — | 6.6 | 6.8 | 7.0 | 7.3 | 7.4 | 7.4 | 7.5 |
| 47 | Taste | — | | | | No abnormality | No abnormality | No abnormality | No abnormality |
| 48 | Odor | — | Musty odor | | Odor-less | No abnormality | No abnormality | No abnormality | No abnormality |
| 49 | Chromaticity | degrees | 4.3 | 0.6 | <0.5 | <0.5 | <0.5 | <0.5 | <0.5 |
| 50 | Turbidity | degrees | 10 | 0.1 | <0.1 | <0.1 | <0.1 | <0.1 | <0.1 |
| | Residual chlorine | mg/l | | | | 0.42 | 0.36 | 0.40 | 0.40 |
| | Judgment | | | | | ○ | ○ | ○ | ○ |

| | | | Water sampling site No. | | | Reference |
|---|---|---|---|---|---|---|
| | | | 8 | 9 | 10 | Value |
| | Water sampling site | | Minami Yamagata Water Distribution Plant (Kashiwakura) | | Miharashino-Oka Water Distribution Plant | |
| | Water Type | | Distribution reservoir water | Hydrant water | Hydrant water | |
| | Date and time of water sampling | | 13th day, 10:20 | 13th day, 9:40 | 13th day, 10:05 | |
| | Weather (previous day/sampling day) | | Fine/fine | Fine/fine | Fine/fine | |
| | Air temperature (° C.) | | 20.6 | 18.8 | 20.2 | |
| | Water temperature (° C.) | | 6.8 | 11.9 | 14.8 | |
| 1 | General bacteria | CFU/ml | 0 | 0 | 0 | 100 or less |
| 2 | *Escherichia coli* | MPN/100 ml | Not detected | Not detected | Not detected | No detection |
| 3 | Cadmium and its compounds | mg/l | | | | 0.003 or less |
| 4 | Mercury and its compounds | mg/l | | | | 0.0005 or less |
| 5 | Selenium and its compounds | mg/l | | | | 0.01 or less |
| 6 | Lead and its compounds | mg/l | | | | 0.01 or less |
| 7 | Arsenic and its compounds | mg/l | | | | 0.01 or less |

TABLE 4-continued

Water quality test results
(Test results of standard items; test date: May, 2013)

No1 (1/3)

| # | Item | Unit | | | | Standard |
|---|---|---|---|---|---|---|
| 8 | Hexavalent chromium and its compounds | mg/l | | | | 0.05 or less |
| 9 | Cyanide ion and cyan chloride | mg/l | | | | 0.01 or less |
| 10 | Nitrate nitrogen and nitrite nitrogen | mg/l | | 0.21 | 0.22 | 10 or less |
| 11 | Fluorine and its compounds | mg/l | | <0.08 | <0.08 | 0.8 or less |
| 12 | Boron and its compounds | mg/l | | | | 1.0 or less |
| 13 | Carbon tetrachloride | mg/l | | | | 0.002 or less |
| 14 | 1,4-Dioxane | mg/l | | | | 0.05 or less |
| 15 | cis-1,2-Dichloroethylene and trans-1, 2-dichloroethylene | mg/l | | | | 0.01 or less |
| 16 | Dichloromethane | mg/l | | | | 0.02 or less |
| 17 | Tetrachloroethylene | mg/l | | | | 0.01 or less |
| 18 | Trichloroethylene | mg/l | | | | 0.01 or less |
| 19 | Benzene | mg/l | | | | 0.01 or less |
| 20 | Chloric acid | mg/l | | <0.06 | <0.06 | 0.6 or less |
| 21 | Chloroacetic acid | mg/l | | | | 0.02 or less |
| 22 | Chloroform | mg/l | | | | 0.06 or less |
| 23 | Dichloroacetic acid | mg/l | | | | 0.04 or less |
| 24 | Dibromochloromethane | mg/l | | | | 0.1 or less |
| 25 | Bromic acid | mg/l | | <0.001 | <0.001 | 0.1 or less |
| 26 | Total trihalomethane | mg/l | | | | 0.1 or less |
| 27 | Trichloroacetic acid | mg/l | | | | 0.2 or less |
| 28 | Bromodichloromethane | mg/l | | | | 0.03 or less |
| 29 | Bromoform | mg/l | | | | 0.09 or less |
| 30 | Formaldehyde | mg/l | | | | 0.08 or less |
| 31 | Zinc and its compounds | mg/l | | | | 1.0 or less |
| 32 | Aluminum and its compounds | mg/l | | | | 0.2 or less |
| 33 | Iron and its compounds | mg/l | | | | 0.3 or less |
| 34 | Copper and its compounds | mg/l | | | | 1.0 or less |
| 35 | Sodium and its compounds | mg/l | | 6.1 | 6.2 | 200 or less |
| 36 | Manganese and its compounds | mg/l | | | | 0.05 or less |
| 37 | Chloride ion | mg/l | | 9 | 9 | 200 or less |
| 38 | Calcium, magnesium and the like (hardness) | mg/l | | 14 | 14 | 300 or less |
| 39 | Evaporation residue | mg/l | | | | 500 or less |
| 40 | Anionic surfactants | mg/l | | | | 0.2 or less |
| 41 | Geosmin | mg/l | 0.000001 | 0.000001 | <0.000001 | 0.00001 or less |
| 42 | 2-Methylisoborneol | mg/l | <0.000001 | <0.000001 | <0.000001 | 0.00001 or less |
| 43 | Nonionic surfactants | mg/l | | | | 0.02 or less |
| 44 | Phenols | mg/l | | | | 0.005 or less |
| 45 | Organic matter (content of | mg/l | 0.3 | 0.3 | 0.3 | 3 or less |

TABLE 4-continued

Water quality test results
(Test results of standard items; test date: May, 2013)

No1 (1/3)

| | | total organic carbon (TOC)) | | | | | |
|---|---|---|---|---|---|---|---|
| 46 | | pH value | — | 7.5 | 7.5 | 7.5 | 5.8 or more and 8.6 or less |
| 47 | | Taste | — | No abnormality | No abnormality | No abnormality | Not abnormal |
| 48 | | Odor | — | No abnormality | No abnormality | No abnormality | Not abnormal |
| 49 | | Chromaticity | degrees | <0.5 | <0.5 | <0.5 | 5 degrees or less |
| 50 | | Turbidity | degree | <0.1 | <0.1 | <0.1 | 2 degrees or less |
| | Residual chlorine | mg/l | | 0.58 | 0.56 | 0.52 | |
| | Judgment | | | ○ | ○ | ○ | ○; Pass |
| | Test period | | | | May 13 to 27, 2013 | | Remarks: |
| | Name of water quality testing institute | | | | Yamagata City Water and Sewer Services Department/Water Supply Operation Center (27 Minami-Ishizeki, Yamagata City) | | |

The present invention should not be limited to the foregoing embodiments and, needless to say, may be modified in various ways within a scope not departing from the gist of the present invention.

The invention claimed is:

1. A method for repairing a concrete structure, comprising:
 a modifying agent supply step of supplying a concrete modifying agent to a concrete structure; and
 a protective agent supply step of supplying a concrete protective agent to the concrete structure,
 the concrete protective agent comprising: an alkali metal-containing silicate; and an alkaline electrolyzed water; wherein the alkali metal includes sodium and at least one of potassium and lithium;
 the protective agent supply step being performed after the modifying agent supply step,
 wherein the concrete modifying agent includes an alkaline electrolyzed water and a calcium ion.

2. The method for repairing a concrete structure according to claim 1, wherein the solubility of calcium ions in the concrete modifying agent is a ratio exceeding 0.17 g per 100 g of the alkaline electrolyzed water.

3. A method for repairing a concrete structure, comprising:
 a modifying agent supply step of supplying a concrete modifying agent including an alkaline electrolyzed water and calcium ions to a concrete structure; and
 a protective agent supply step of supplying the concrete protective agent including an alkali metal-containing silicate and an alkaline electrolyzed water to the concrete structure, the protective agent supply step being performed after the modifying agent supply step.

4. The method for repairing a concrete structure according to claim 3, wherein the solubility of calcium ions in the concrete modifying agent is a ratio exceeding 0.17 g per 100 g of the alkaline electrolyzed water.

* * * * *